United States Patent
Yasutake

(10) Patent No.: US 7,251,506 B2
(45) Date of Patent: Jul. 31, 2007

(54) MOBILE PHONE SYSTEM WITH INCOMING MELODY DESIGNATING FUNCTION AND MOBILE PHONE

(75) Inventor: Hiroshi Yasutake, Tokyo (JP)

(73) Assignee: NEC Corporation, Tokyo (JP)

( * ) Notice: Subject to any disclaimer, the term of this patent is extended or adjusted under 35 U.S.C. 154(b) by 277 days.

(21) Appl. No.: 10/969,355

(22) Filed: Oct. 21, 2004

(65) Prior Publication Data

US 2005/0090292 A1   Apr. 28, 2005

(30) Foreign Application Priority Data

Oct. 27, 2003  (JP)  ............... 2003-366168
Aug. 12, 2004  (JP)  ............... 2004-235324

(51) Int. Cl.
   *H04B 1/38*   (2006.01)
   *H04M 3/00*   (2006.01)
   *H04M 1/663*  (2006.01)

(52) U.S. Cl. ............... 455/567; 455/419; 455/412.2
(58) Field of Classification Search ............... 455/567, 455/419, 412.2
   See application file for complete search history.

(56) References Cited

U.S. PATENT DOCUMENTS

| | | | | |
|---|---|---|---|---|
| 6,070,053 | A * | 5/2000 | Yamashita | 340/7.58 |
| 6,094,587 | A * | 7/2000 | Armanto et al. | 455/567 |
| 6,418,330 | B1 * | 7/2002 | Lee | 455/567 |
| 2004/0066920 | A1 * | 4/2004 | Vandermeijden | 379/88.19 |
| 2004/0067751 | A1 * | 4/2004 | Vandermeijden et al. | 455/414.1 |
| 2005/0163300 | A1 * | 7/2005 | Kawakami et al. | 379/207.16 |
| 2005/0169446 | A1 * | 8/2005 | Randall et al. | 379/93.23 |

FOREIGN PATENT DOCUMENTS

| | | |
|---|---|---|
| JP | 11-355393 | 12/1999 |
| JP | 2002-64658 | 2/2002 |
| JP | 2003-46664 | 2/2003 |
| JP | 2003-174511 | 6/2003 |
| JP | 2003-233622 | 8/2003 |
| JP | 2003-273996 | 9/2003 |

* cited by examiner

*Primary Examiner*—Nick Corsaro
*Assistant Examiner*—Christopher M. Brandt
(74) *Attorney, Agent, or Firm*—Young & Thompson

(57) ABSTRACT

A mobile phone system in which the incoming melodies, used in making a call, are not registered at the outset, and a desired incoming melody, out of plural incoming melodies, stored in a network server, may be selected and designated, so that a large variety of incoming melodies may be optionally designated each time a call is made. In a network server 103, there are stored plural incoming melodies. When making a call, a transmitting party selects, from a transmitting side mobile phone 101, an incoming melody for a receiving party, from the list of the incoming melodies in the network server 103, and transmits an ID corresponding to the selected incoming melody as a call signal to the network 102. The network server 103 reads out incoming melody data from the designated ID to send the so read-out data to an incoming side mobile phone 106.

19 Claims, 14 Drawing Sheets

MOBILE PHONE SYSTEM WITH INCOMING MELODY DESIGNATING FUNCTION AND MOBILE PHONE

FIELD OF THE INVENTION

This invention relates to a mobile phone system, and mobile phones, fitted with an incoming melody designating function. More particularly, it relates to a mobile phone system, and mobile phones, fitted with an incoming melody designating function, in which a transmitting party selects, out of the plural incoming melodies stored in a network server, the incoming melody which the transmitting party desires to be replayed by a mobile phone of a receiving party, thereby enabling the transmitting party to designate the incoming melody of the mobile phone of the receiving party.

BACKGROUND OF THE INVENTION

In a mobile phone, an incoming call or an incoming message is announced by a method consisting in pre-storing an incoming melody, replayed on incoming of a call or a message, in an incoming melody storage unit, incoming melody data is read out from an incoming melody storage unit, on incoming of a call or a message, and replayed via e.g. a loudspeaker.

The incoming melody is stored in e.g. an incoming melody storage unit of a mobile phone D01 or a mobile phone D04, as shown in FIG. 13. A plural melody of incoming melody data are stored in an incoming melody storage area of a storage unit E09 in the mobile phone, as shown in FIG. 14. On incoming of a call or a message, the mobile phone reads out pre-selected or pre-set incoming melody data, out of the stored data, converts the data by a control circuit E05 and converts the so read-out data by an incoming sound outputting circuit E07 into signals by a loudspeaker E07 to cause sound radiation from a loudspeaker E08.

In this conventional technique, only the incoming melody, selected and set by a receiving party from plural incoming melodies, pre-stored in a storage unit of the mobile phone of the receiving party, is replayed, while it is not possible for the transmitting party to designate the incoming melody of the receiving party. For example, it is not possible for the transmitting party to impart the transmitting party's intention or the order of priority by the incoming melody of the mobile phone of the receiving party.

Thus, the receiving party is unable to discern the intention of the transmitting party or the order of priority of the contents of the telephone call, such that there may be occasions where the receiving party in the engrossed state accepts the call even though the order of priority of the telephone call is low, or where the receiving party rejects the call even though the order of priority of the telephone call is high. Moreover, since the incoming melodies are stored in advance in a storage unit of the mobile phone, and hence the memory capacity needs to be increased if it is attempted to store more incoming melodies, there are imposed limitations on the melody of the musical melodies of the incoming melodies that may be stored in the storage unit in the mobile phone with a limited storage capacity.

For coping with such problem, Patent Document 1 shows a method consisting in specifying the ringing pattern of the incoming sound of the receiving mobile phone from the transmitting side, appending specified melody pattern data to a call setting message, and in transmitting the resultant data. The incoming side analyzes the message, sent from the transmitting side, and extracts the melody pattern data to radiate the sound from the loudspeaker. With this method, the incoming melody of the receiving party can be specified from the transmitting party, and hence the intention of the transmitting party as well as the order of priority may be imparted to the receiving party. However, if more different incoming melodies are used by the transmitting party, it becomes necessary to increase the memory capacity in the mobile phone.

Moreover, since the incoming melody data is appended by the transmitting side mobile phone and sent to the incoming side mobile phone so that the appended incoming melody is replayed on the incoming side mobile phone, the incoming melody data needs to be sent from the transmitting side mobile phone over the network to the incoming side mobile phone, thus increasing the load imposed on the network.

In Patent Document 2, incoming announcing melodies are stored in advance in a database connected to a relay station or in a data file of an Internet server, in association with a registration melody, from one transmitting side mobile phone to another. The transmitting party first dials the telephone number of the counterpart party and transmits the registration melody of an incoming announcing melody, stored in the database or the Internet server, by appending the registration melody to the call setting message. The relay station extracts the call melody and the registration melody of the incoming announcing melody, from the received call setting message, and reads out melody pattern data for the incoming announcement, associated with the same transmission melody as the call melody, from the database or the Internet server, to generate a call setting message including the melody pattern data for incoming announcement, to transmit the so generated call setting message to the incoming side mobile phone. This allows coping with a case where there is no sufficient memory capacity to store the melody pattern data for the incoming announcement on the part of the transmitting side mobile phone.

In Patent Document 3, registration processing is carried out between the mobile phone and the registration server to store designation data, such as incoming melody data, associated with the telephone number of the mobile phone, at the time of calling, in a database server. On receipt of a call from a mobile phone, an exchanger acquires designation data, stored in the database server in association with the telephone number of the calling mobile phone, and transmits the so acquired designation data to the calling mobile phone, along with the call melody. The calling mobile phone replays and outputs the designation data, such as incoming melody data, sent with the call signal, thus allowing the transmitting party to designate the incoming melody for the incoming side mobile phone.

In the inventions disclosed in Patent Documents 2 and 3, the incoming melodies at the time of calling are stored not in the transmitting side mobile phone, but in the server, so that there is no necessity for providing a memory capacity for storage of the melody pattern data for incoming announcement, appended at the time of a call from a mobile phone. Moreover, the incoming melody data is transmitted from the server to the incoming side mobile phone and hence there is no necessity for sending the incoming melody data from the transmitting side mobile phone to the network server, thus relieving the load otherwise imposed on the network.

[Patent Document 1]
Japanese Patent Kokai Publication No. JP-A-11-355393

[Patent Document 2]
Japanese Patent Kokai Publication No. JP-P2002-64658A

[Patent Document 3]
Japanese Patent Kokai Publication No. JP-P2003-174511A

SUMMARY OF THE DISCLOSURE

In the inventions stated in Patent Documents 2 and 3, in which incoming melody data stored at the outset in the network server from one mobile phone to another are designated in making a call, and sent to the incoming side mobile phone, there is no necessity for providing a memory for storage of incoming announcing melody data, to be appended in making a call from a mobile phone, in each mobile phone, while there is no necessity for transmitting incoming announcing melody data per se from the transmitting side mobile phone to the network, thus relieving the load otherwise imposed on the network. It is however necessary to register the incoming melody data, used by each mobile phone, in the network server. In addition, there is a problem that only the pre-registered incoming melodies may be used.

There is also a problem that, if the transmitting side mobile phone has designated the transmission of the incoming melody data, the network server automatically transmits the designated incoming melody data to the incoming side mobile phone, irrespective of the state of the incoming side mobile phone, so that, if the incoming side mobile phone is set to the manner mode, the receiving party is charged with the incoming melody use fee despite the fact that the incoming melody is not replayed.

It is an object of the present invention to provide a system of reading out the incoming melody designated by a transmitting party from the incoming melody storage unit provided in a network server and transmitting the so read out melody to the incoming side mobile phone, in which the incoming melodies used in calling are not registered at the outset, but a desired incoming melody is selected and designated from time to time from plural incoming melodies stored in the network server, so that a desired incoming melody may be designated from one call to another from a wide variety of incoming melodies.

It is another object of the present invention to provide a system in which transmission/non-transmission of designated incoming melody data may be controlled, in dependence upon the state of the incoming side mobile phone, thereby preventing wasteful incoming melody use fee from being charged.

In one aspect, the present invention provides a mobile phone system fitted with the incoming melody designating function, in which the system comprises mobile phones, a network to which the mobile phones are connectable, and a network server for storing a plurality of incoming melody data in association with identifiers (IDs) thereof. Any one of the mobile phones includes means for retrieving a list of incoming melodies stored in the network server, means for designating, by the ID, a desired incoming melody, as selected by the retrieving function, means for appending an ID of the selected incoming melody to transmission information that includes a contact site of a counterpart party, to send out the resultant ID-transmission information to the network, and means for extracting an incoming melody data to replay the incoming melody data by incoming announcing means, on receipt of the incoming information including the incoming melody data from the network. The network includes means for extracting the ID of the incoming melody from the transmission information, received from the mobile phone, and having the ID of the incoming melody appended thereto, and for transmitting the extracted ID to the network server, and means for appending incoming melody data corresponding to the ID, received from the network server, to the incoming information, corresponding to the transmission information, and for transmitting the melody data-incoming information to another mobile phone specified by the transmission information. The network server includes means for reading out an incoming melody data corresponding to the ID thereof on receipt of the ID from the network and for transmitting the so read-out incoming melody data to the network.

In a second aspect, the present invention provides a mobile phone system fitted with the incoming melody designating function, in which the system comprises mobile phones, a network to which is connected the mobile phone, and a network server for storing a plurality of incoming melody data in association with identifiers (IDs) thereof. Any of the mobile phones includes means for retrieving a list of incoming melodies stored in the network server, means for designating, by one of the IDs, a desired incoming melody, as selected by the retrieving function, means for appending an ID of the selected incoming melody to transmission information that includes a call signal or a mail address, to send out the resultant ID-transmission information to the network, and means for extracting the incoming melody data to replay the incoming melody data by incoming announcing means, on receipt of the incoming information including the incoming melody data from the network. The network includes means for extracting the ID of the incoming melody from the transmission information, received from the mobile phone, and having the ID of the incoming melody appended thereto, and for transmitting the extracted ID to the network server, and means for appending an incoming melody data, corresponding to the ID, received from the network server, to the incoming information, corresponding to the transmission information, and for transmitting the melody data-incoming information to another mobile phone specified by the transmission information. The network server includes means for reading out an incoming melody data corresponding to the ID thereof on receipt of the ID from the network and for transmitting the so read-out incoming melody data to the network.

The mobile phone may include means for setting a manner mode, means for halting the replay of the incoming melody data when the manner mode has been set and when the incoming information added by the incoming melody data has been received from the network, means for storing at least the incoming melody data when the incoming information added by the incoming melody data has been received, and means for extracting the stored incoming melody data by release of the manner mode or by opening the incoming information and for replaying the incoming melody by incoming announcing means.

The mobile phone may also include means for setting a manner mode, and means for transmitting the manner mode setting information to the network on receipt of a manner mode setting conformation signal from the network. The network includes means for transmitting the manner mode setting conformation signal to another mobile phone specified by the transmission information, and means for halting the transmission of the incoming melody data to the other mobile phone on receipt of the information indicating the setting of the manner mode from the other mobile phone.

In the mobile phone system fitted with the incoming melody designating function, according to the present invention, the mobile phone includes means for transmitting unique melody data, formulated by a transmitting party, or sound data, obtained on recording a speech, to the network server, as incoming melody data to the network server, for registration therein. The network server includes original incoming melody storage unit for registering unique melody data, formulated by a transmitting party, or sound data obtained on recording the speech, as the ID is appended to the unique melody data or sound data.

The network server may include means for transmitting to the network the incoming melody data read out at random from a specified genre, when the ID received over the network from the mobile phone specifies the genre of the incoming melody.

The mobile phone may also include an incoming melody designation melody name history storage unit for storing the history of the incoming melodies designated in the past, and means for selecting and designating the incoming melody ID from the incoming melody designation melody name history storage unit.

The network server may be designed as a contents provider server for storage not only of the incoming melody data but of a variety of application data in association with an identifier (ID), and may include means for selecting and reading out the application data corresponding to the ID designated from the mobile phone over the network, and means for transmitting the read-out application data over the network to an incoming side contact site from the mobile phone. The mobile phone may include means for acquiring a list of the applications from the contents provider server over the network, means for selecting one or more desired application data, to be sent to the incoming side mobile phone, from the list, and means for transmitting the information pertinent to the incoming side contact site to the contents provider server.

The meritorious effects of the present invention are summarized as follows.

According to the present invention, a transmitting party, making a call or transmitting a mail, may suitably select an incoming melody from the network server, in keeping with the order of priority of the call, the intention of the call or with the feeling in making the call, and designate the incoming melody for the incoming side mobile phone, while the receiving party may decide on the order of priority of the call from the transmitting party or the intention of the call to give a decision as to whether or not the telephone call is to be received.

Since the incoming melody data is stored not in the mobile phone but in a large capacity storage unit provided in the network server, a large variety of the incoming melodies can be used, while the saving in the storage capacity of the mobile phone can be achieved.

Moreover, there is no necessity of transmitting the incoming melody data from the transmitting side mobile phone to the network, but it is only necessary to transmit the ID of the incoming melody, thus relieving the load otherwise imposed on the network.

Before the network server transmits the incoming melody, designated by the transmitting side mobile phone, the network confirms whether or not the incoming side mobile phone is set to the manner mode. If the incoming side mobile phone is set to the manner mode, the designated incoming moldy is deterred from being sent to the incoming side mobile phone, thereby further relieving the load otherwise imposed on the network.

By providing and exploiting an original incoming melody storage unit in the network server for saving the incoming melodies or voice created by the transmitting party, it is possible to increase the range of the genre as the designated incoming melodies.

By storing the history of melody names of the incoming melodies, designated in the past, in a storage unit of the mobile phone, and by designating the incoming melody, in making a call or transmitting a mail, by having reference to this history, the operation of acquiring the information from the network in designating the incoming melody may be omitted, thereby further relieving the load otherwise imposed on the network.

Furthermore, by constructing the network server as a contents provider server, and by storing application data, such as incoming melodies, games, wall paper or animation, in the storage unit, the transmitting party is able to transmit one or more of the games, wall paper or the animation to the incoming party, in addition to the incoming melodies.

PREFERRED EMBODIMENTS OF THE INVENTION

Figure 1:
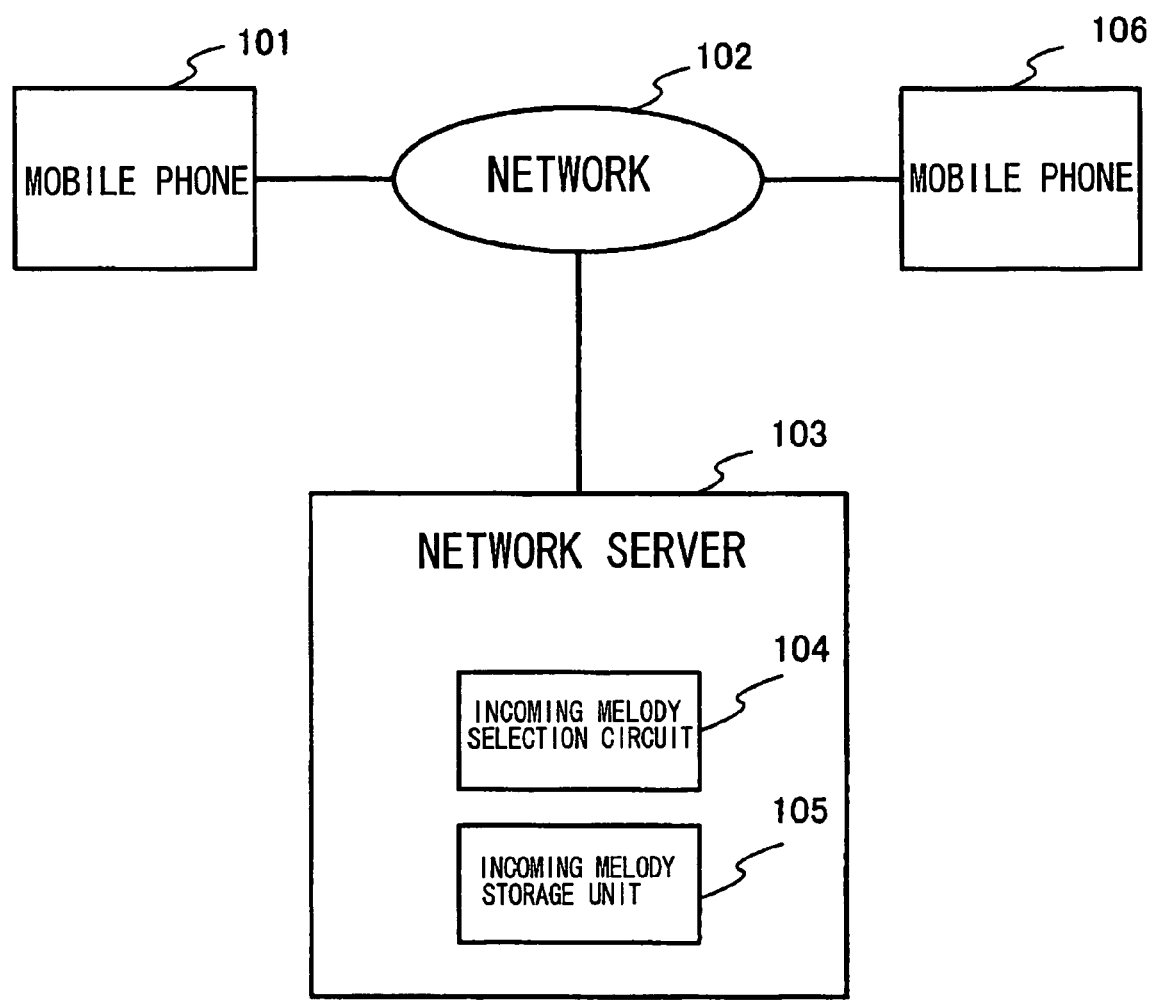
FIG. 1 is a block diagram showing a mobile phone system fitted with an incoming melody designating function according to a first embodiment of the present invention.

FIG. 1 is a block diagram showing a mobile phone system fitted with an incoming melody designating function according to a first embodiment of the present invention.

The mobile phone system fitted with the incoming melody designating function according to the present embodiment includes mobile phones 101, 106, a network 102, and a network server 103, which network server includes an incoming melody selection circuit 104 for selecting the music melody designated by an ID (identifier) when the mobile phone 101 sends a call or a mail (that is, when the mobile phone 101 sends out the transmitted information including the site of contact of the counterpart party) and an incoming melody storage unit 105 having the incoming melodies stored therein.

In the incoming melody storage unit 105 of the network server 103, there are stored plural incoming melodies from the outset. Using the mobile phone 101, the transmitting party acquires a list of the incoming melodies, stored in the incoming melody storage unit 105 of the network server 103, over the network 102.

Then, using the retrieving function of the mobile phone 101, the transmitting party selects an ID corresponding to an optional incoming melody matched to the order of priority of the call contents or the intended vision, from the list of the incoming melodies, to designate the selected ID to the incoming melody selection circuit 104. The ID designated for the incoming melody selection circuit 104 is transmitted at the same time as the transmitting party acts on the telephone number or the mail address of the mobile phone 106 of the counterpart party with the mobile phone 101 to make a call or send a mail.

On receipt of a call or a mail from the mobile phone 101, the network 102 transmits the call or the mail to the network server 103, while transmitting data of the incoming melody, more precisely, the incoming information including the data of the incoming melody, designated by the ID, to the mobile phone 106. The mobile phone 106 converts incoming melody data, received from the network 102, into data that can be replayed over the loudspeaker of the mobile phone 106, to cause the sound radiation from the loudspeaker.

If, when the mobile phone 106 is set to the manner mode, the mobile phone 106 has received the incoming melody data, more precisely, the incoming information including the incoming melody data, it is possible for the mobile phone 106 to halt the replay of the incoming melody data to store the melody data. In such case, the incoming melody data as stored may be extracted with the release of the manner mode or with the operation for displaying the incoming information to cause the replay of the incoming melody by incoming announcing means. If, in this case, plural incoming melody data are stored with plural calls, replay of the incoming melody data may be commenced in the order in which the melody data have been stored.

Figure 2:
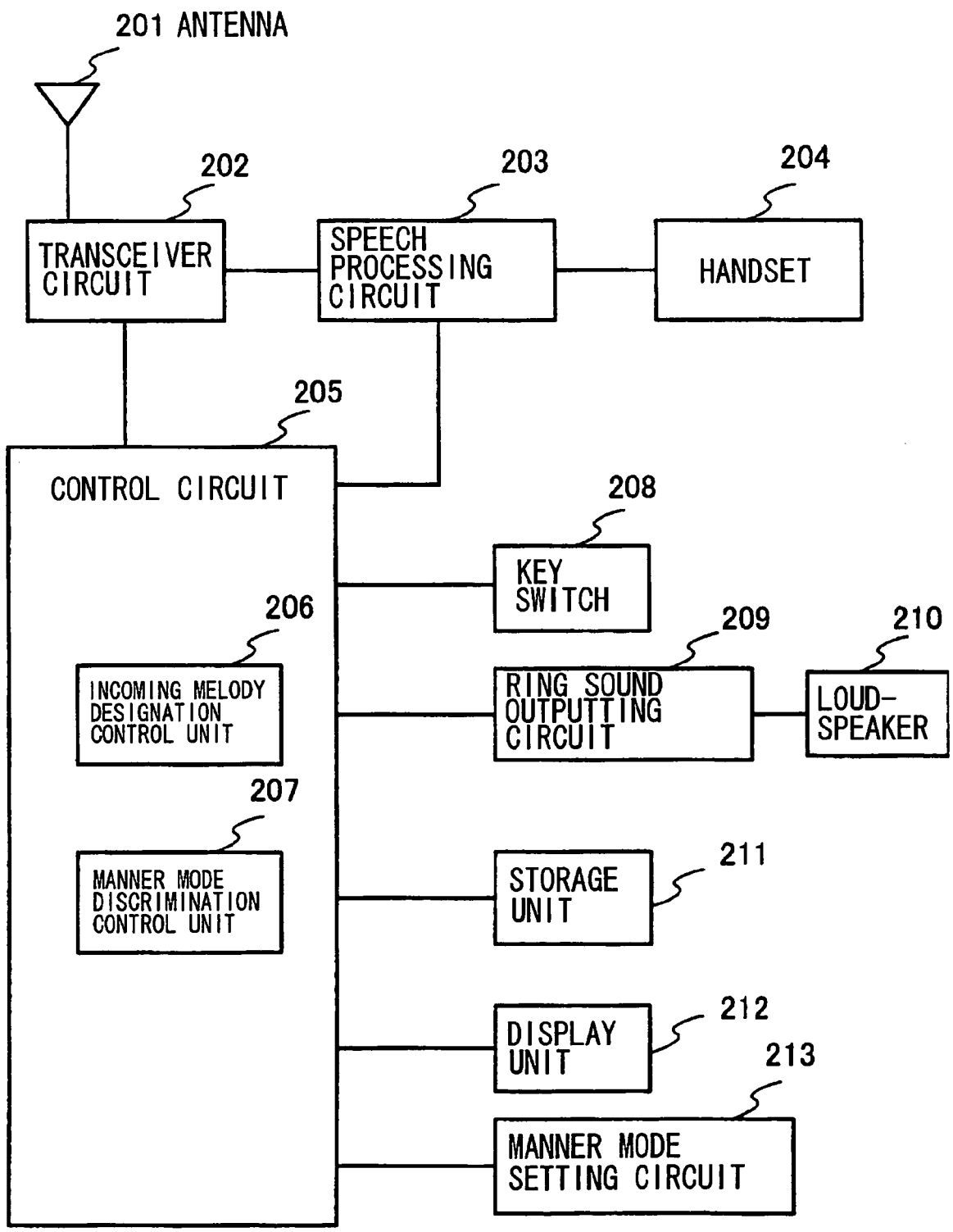
FIG. 2 is a block diagram showing a mobile phone fitted with an incoming melody designating function according to the first embodiment.

Referring to FIG. 2, which is a block diagram showing a mobile phone fitted with the incoming melody designating function of the present embodiment, the mobile phone includes an antenna 201, a transceiver circuit 202 for controlling the wireless communication, a speech processing circuit 203 for converting speech signals into digital signals or for converting the digital signals into speech, a handset 204, a control circuit 205 for performing various controls for the mobile phone, such as transmission/receipt control, speech processing control or display control, a key switch 208, made up of plural keys for performing various controls, such as incoming melody transmission or setting, a ring sound outputting circuit 209, and a loudspeaker 210. The mobile phone also includes a storage unit 211 for storing the history of incoming calls, telephone numbers or mail addresses, and setting values of various data, a display unit 212 and a manner mode setting circuit 213.

The storage unit 211 transiently holds the incoming melody data received. The incoming melody data, stored in the storage unit 211, is converted by the ring sound outputting circuit 209 into data that may be radiated by the loudspeaker 210, so that the loudspeaker 210 may radiate the sound based on the so converted data.

The control circuit 205 includes an incoming melody designation control unit 206 for selecting and designating an ID of an incoming melody of interest from the list of the incoming melodies stored in the network server 103, and a manner mode discrimination control unit 207 for verifying if the current mode is the manner mode and for notifying the network 102 of the fact that the current mode is the manner mode if it is so.

If a call or a mail is transmitted, using the melody designating function of the present invention, the transmitting party first requests a list of the incoming melodies within the network server 103. The antenna 201 receives the list of the incoming melodies, sent from the network server 103, over the network 102. The control circuit 205 displays the list of the incoming melodies on the display 212 at the time of the operation of the incoming melody selection display menu.

The transmitting party selects, from the list of the incoming melodies, an ID corresponding to the incoming melody suited to the order of priority of the call or mail to be transmitted, or to the intended contents, by acting on the key switch 208. When the transmitting party acts on the key switch 208 to select the target telephone number or the target mail address (with the mail) to transmit the call or the mail by antenna 201 to the network 102 via control circuit 205 and transceiver circuit 202, the incoming melody designation control unit 206 transmits the ID, corresponding to the designated incoming melody, via transceiver circuit 202 and antenna 202 to the network 102.

On receipt of a call or a mail, data of the incoming melody, transmitted over the network 102, is received by the antenna 201, so as to be converted by the control circuit 205 into sound data The control circuit 205 outputs the as-converted sound data to the loudspeaker 210 to play the incoming melody sent over the network 102.

Figure 3:
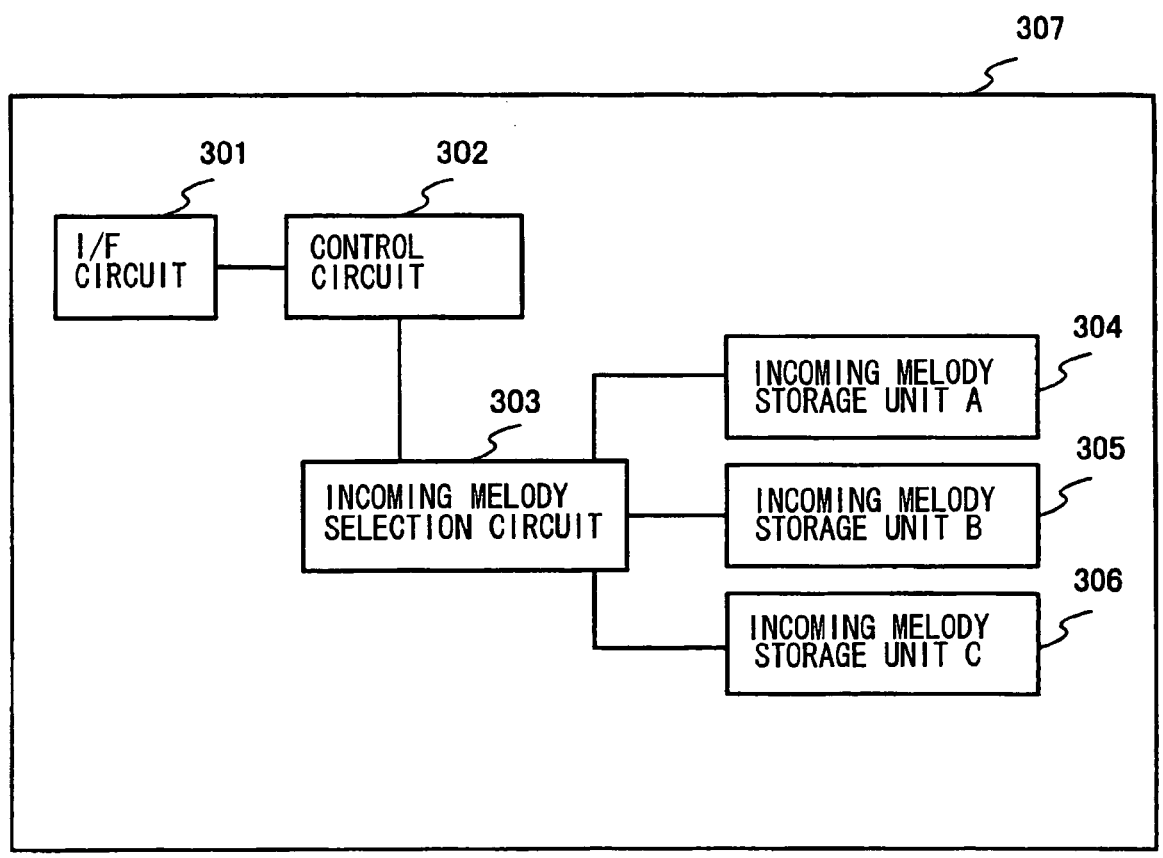
FIG. 3 is a block diagram showing a network server in the first embodiment.

FIG. 3 is a block diagram showing a network server in the first embodiment. An I/F circuit 301 transmits/receives incoming melodies or IDs thereof, or transmits a list of the incoming melodies, over the network 102. The incoming melodies are stored in incoming melody storage units A304, B305 and C306, according to genres.

The incoming melodies may be suitably classified according to genres, such as into melodies expressing pleasant feeling, melodies expressing anger, melodies expressing the feeling of apology, or into jazz, classic or pops. The control circuit 302 controls an incoming melody selection circuit 303 or updates and supervises the list of the incoming melodies.

Figure 4:
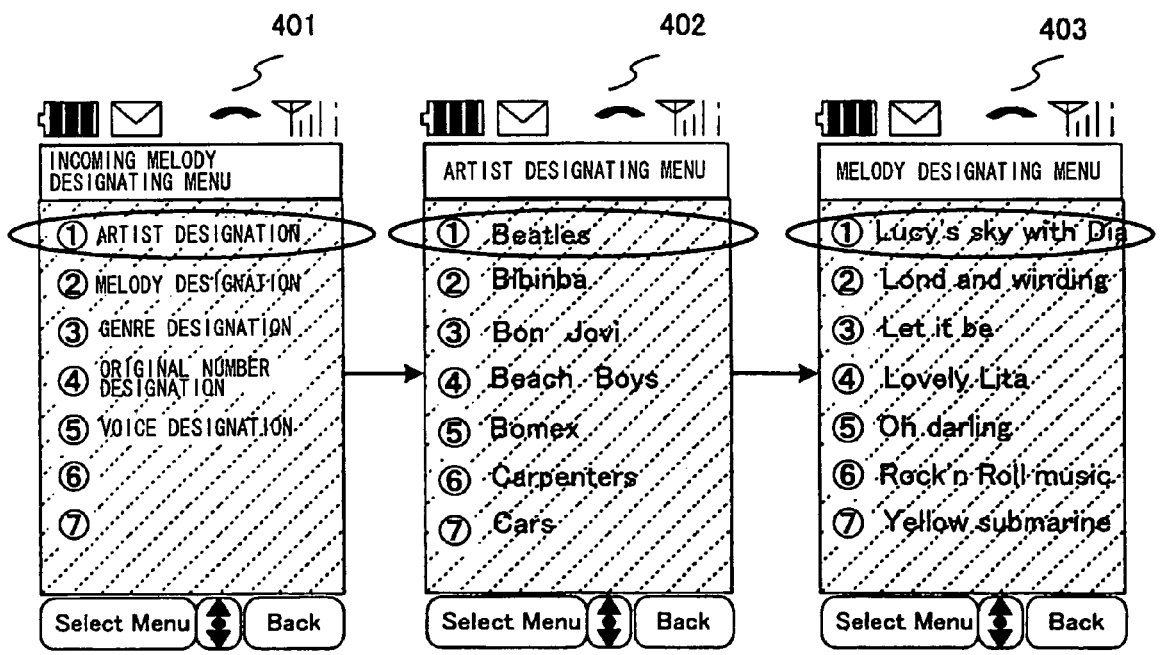
FIG. 4 illustrates a menu image surface for designating the incoming melody by a transmitting side phone.

FIG. 4 shows an example of an incoming melody designation menu display surface which may allow a user to designate a melody by exploiting the retrieving function of the mobile phone provided with the incoming melody control function.

When the network server 103 is accessed from the mobile phone fitted with an incoming melody controlling function of the present embodiment, an uppermost order image surface 401 of the incoming designation menu is demonstrated on the display 212. The transmitting party selects the desired menu from artist designation, melody designation, genre designation, designation of the original melody, prepared by the transmitting party, in designating the incoming melody, and voice designation designating the voice data recorded by the transmitting party by a voice memo.

If artist designation, as an example, is selected, an artist designation menu 402 is demonstrated on the display 212. If Beatles, for example, is selected, a melody designation menu 403 of Beatles is demonstrated on the display 212. The transmitting party selects an optional melody from the displayed melodies. When calling, the mobile phone 101 sends an ID of the optional melody selected, that is, the ID of the incoming melody, along with the telephone number of the counterpart party, to the network 102.

Figure 5:
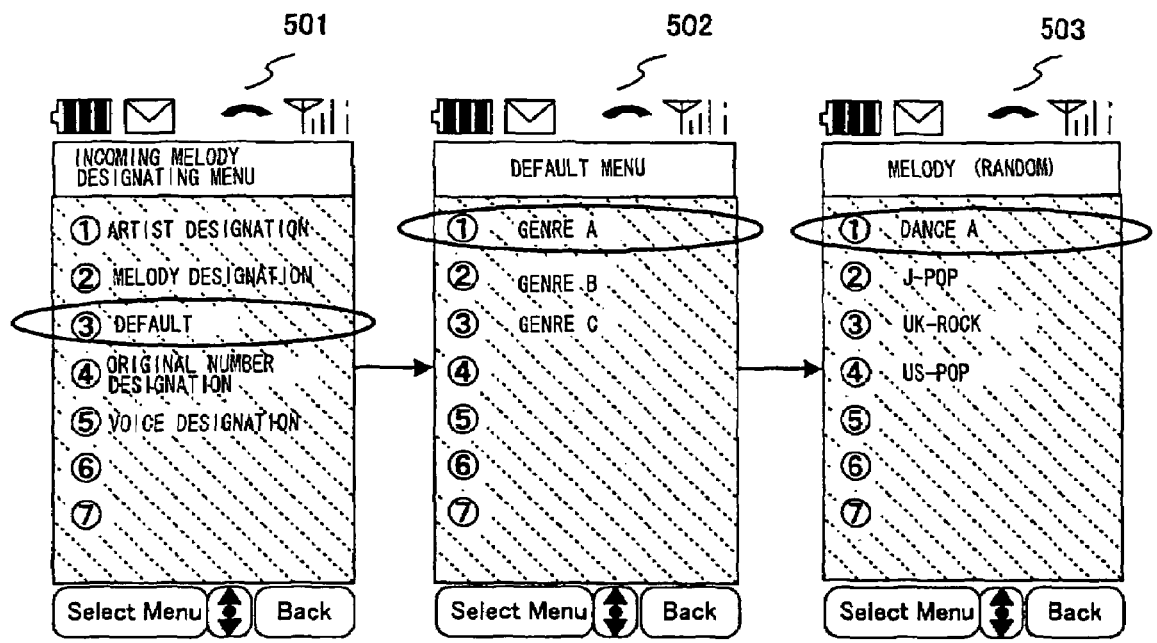
FIG. 5 illustrates a case of a transmitter of a transmitting side mobile phone designating the genre of the incoming melody.

FIG. 5 shows another example of the incoming melody designation menu display image surface until the user comes to designate the melody, in the mobile phone fitted with the incoming melody designating function of the present embodiment, and specifically shows a case where the transmitting party is responsible up to genre designation and the network server is responsible for melody designation.

When the network server 103 is accessed from the mobile phone fitted with the incoming melody designating function of the present embodiment, an uppermost image surface 501 of the incoming melody designation menu is demonstrated in the display unit 212. For example, if a default menu is selected, as an example, a default menu 502 is demonstrated in the display unit 212. For example, if the genre A is selected, a menu 503, designating a suitable genre within the genre A, is demonstrated in the display unit 212. Here, the dance A is selected, as an example.

When calling, the mobile phone sends to the network an ID corresponding to the dance A, along with the telephone number of the counterpart party (a mail and a mail address in case of transmitting a mail). As from this time, the network server 103 designates any suitable dance melody at random from the dance A to send the melody data to the incoming side mobile phone.

Figure 6:
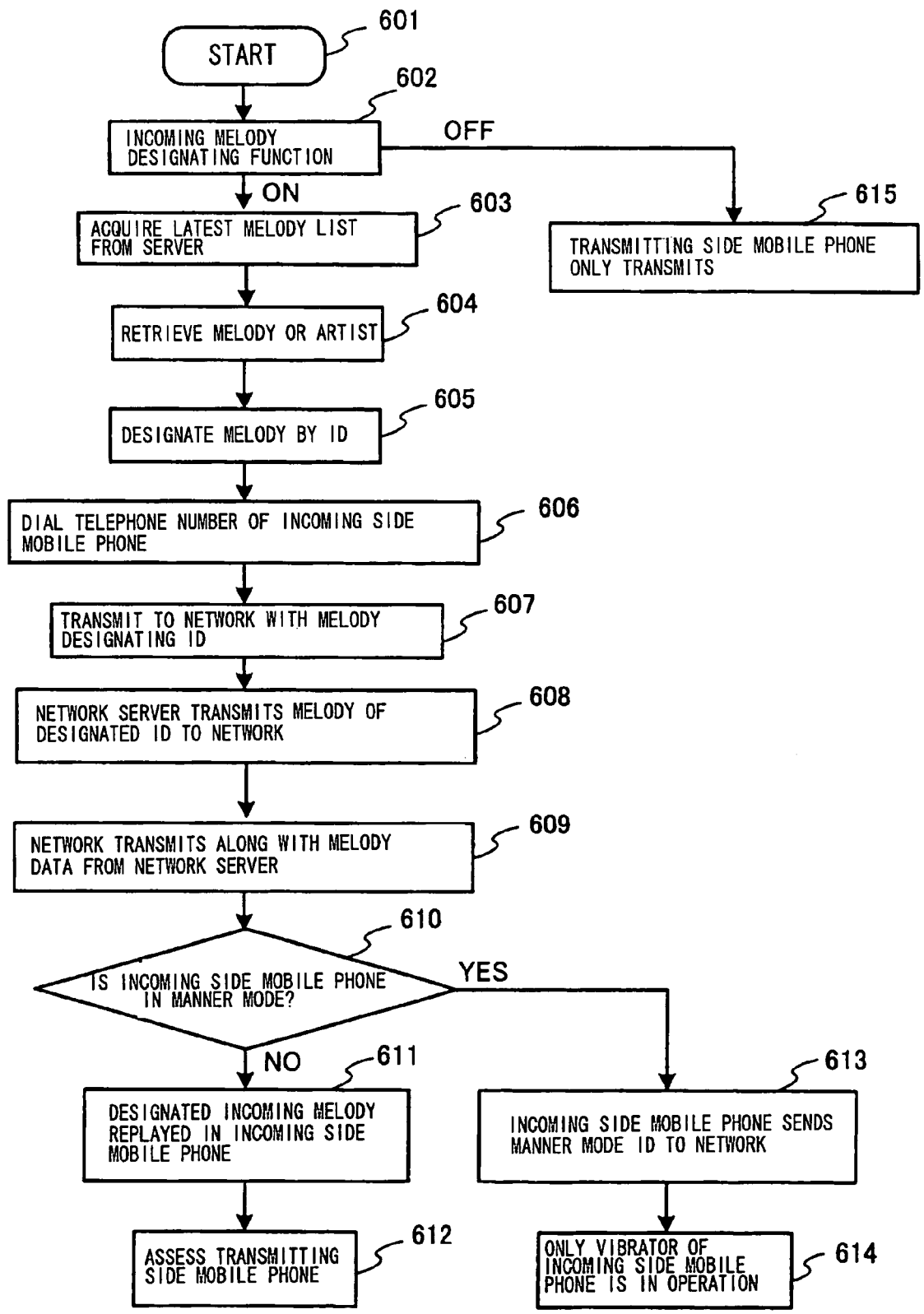
FIG. 6 is a flowchart showing the control operation of the present embodiment.

FIG. 6 depicts a flowchart showing the control in the mobile phone system fitted with the incoming melody designating function of the present embodiment. The operation of the mobile phone system fitted with the incoming melody designating function of the present embodiment is now explained with reference to FIGS. 1 to 6. In FIG. 6, there is shown an example of having a call.

When calling from the mobile phone 101 to the mobile phone 106, the transmitting party effectively sets the incoming melody designating function of the mobile phone 101 (step 602) and requests a list of the incoming melodies with the mobile phone 101 from the network server 103 to acquire the list (step 603). The desired incoming melody is retrieved from the names of the melodies or from the artists (step 604). The melody of the incoming melody is determined from the contents retrieved in the step 604 (step 605).

The transmitting party then dials the telephone number of the mobile phone 106 of the desired counterpart party of communication to make a call (step 606). The mobile phone 101 of the transmitting side sends this call melody, along with the ID designating the incoming melody determined in the step 605 (step 607), to the network 102. The network 102 requests incoming melody data, corresponding to the ID, designated in the step 605, from the network server 103 (step 608).

The network 102 sends the incoming melody data, acquired in the step 608, to the mobile phone 106 of the incoming side (step 609). If the incoming side mobile phone 106 is not set to the manner mode (NO in the step 610), the mobile phone 106 of the incoming side replays the incoming melody transmitted in the step 609 (step 611). The transmitting party of the transmitting side mobile phone 101 is charged with the incoming melody use fee (step 612).

If the mobile phone 106 of the incoming side is in the manner mode (YES of the step 610), the mobile phone 106 of the incoming side notifies the network 102 of that effect (step 613). In this case, the incoming side mobile phone 106 actuates only a vibrator, without replaying the incoming melody (step 614). Thus, if it is notified from the incoming side mobile phone 106 that it is set to the manner mode, the transmitting party of the transmitting side mobile phone is not charged with the use fee of the incoming melody.

If, in the step 602, the incoming melody designating function of the transmitting side mobile phone 101 is OFF, only the telephone number of the incoming side mobile phone 106 is transmitted. If, on the other hand, the incoming melody designating function of the incoming side mobile phone 106 is OFF, the incoming melody stored and set on the incoming side mobile phone is replayed, as conventionally, even if the incoming side mobile phone 106 has received the call with the designated incoming melody from the transmitting side mobile phone (step 615).

Figure 7:
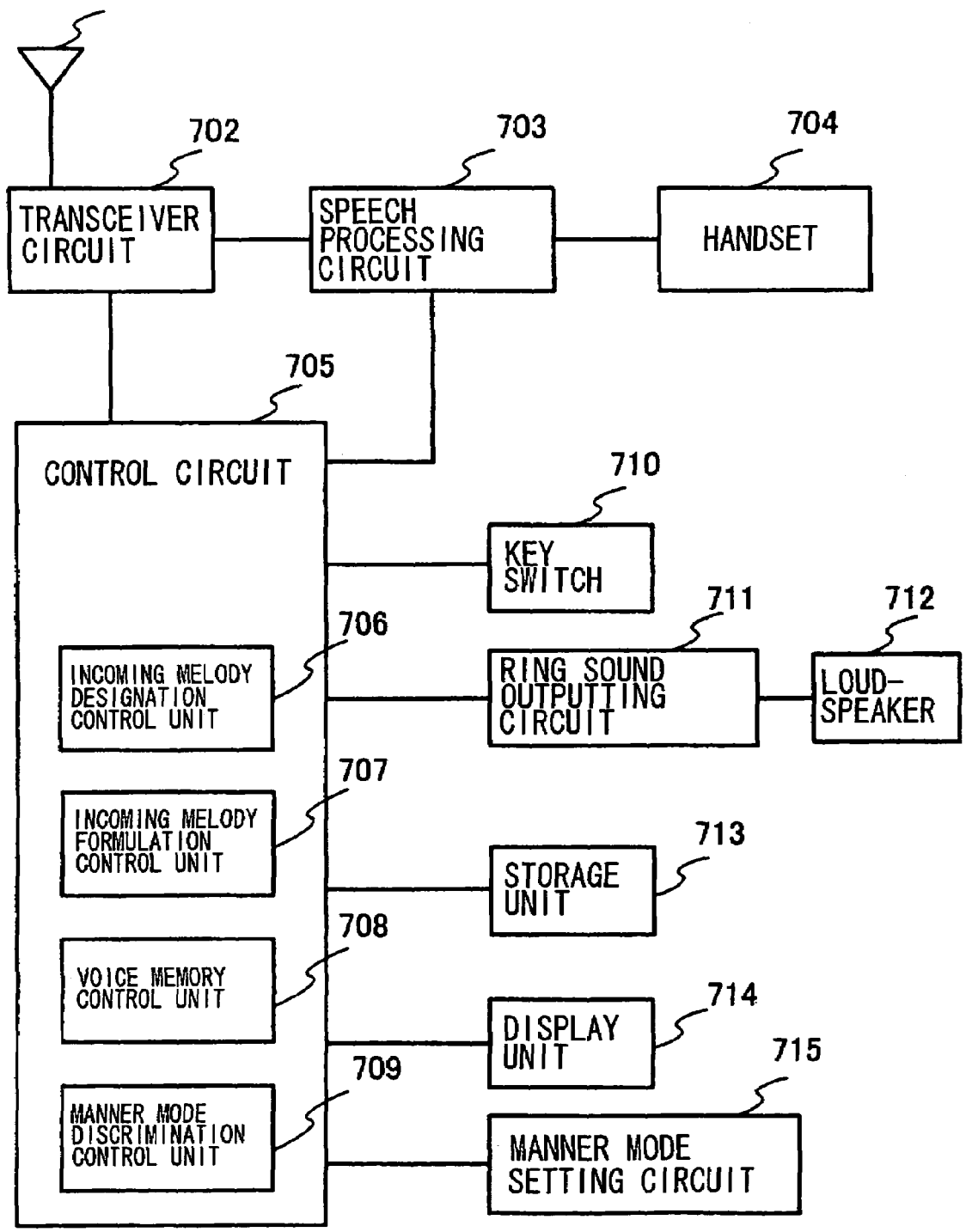
FIG. 7 is a block diagram showing a mobile phone fitted with an incoming melody designating function according to a second embodiment of the present invention.

FIG. 7 depicts a block diagram showing a mobile phone fitted with an incoming melody designating function according to a second embodiment of the present invention.

In the present embodiment, as in the previous embodiment, the mobile phone includes an antenna 701, a transceiver circuit 702 for controlling the wireless communication, a speech processing circuit 703 for converting speech signals into digital signals or for converting the digital signals into speech, a handset 704, a control circuit 705 for performing various controls for the mobile phone, such as transmission/receipt control, speech processing control or display control, a key switch 710, made up of plural keys for performing various controls, such as incoming melody transmission or setting, a ring sound outputting circuit 711, and a loudspeaker 712. The mobile phone also includes a storage unit 713 for storing the hysteresis of incoming calls, telephone numbers or mail addresses, and setting values of various data, a display unit 714 and a manner mode setting circuit 715.

In the present embodiment, the control circuit 705 of the mobile phone fitted with the incoming melody designating function includes, in addition to an incoming melody designating controller 706 for selecting and designating the ID of the relevant incoming melody from the list of the incoming melodies, stored in the network server, and a manner mode check controller 709 for verifying whether the manner mode is set and, if the manner mode is set, notifies the network of such effect, an incoming melody formulation control unit 707 for self-formulating the incoming melody and a voice memory control unit 708 for recording the voice.

In the present embodiment, as in the first embodiment, a plural melody of incoming melodies are stored in the incoming melody storage unit 105 in the network server 103. Using the mobile phone 101, the transmitting party acquires a list of the incoming melodies stored in the incoming melody storage unit 105 of the network server 103 over network 102. Using the retrieval function of the mobile phone 101, the transmitting party selects, from the list of the incoming melodies, an ID corresponding to an optional incoming melody which is in keeping with the order of priority of the call contents and with the vision on the part of the transmitting party.

The ID corresponding to the incoming melody as selected is transmitted at the same time as the transmitting party enters the telephone number or the mail address of the mobile phone 106 on the mobile phone 101 to make a call or transmit a mail. On receipt of the call or the incoming mail from the mobile phone 101, the network 102 transmits an ID corresponding to the selected incoming melody to the network server 103. The incoming melody selection circuit 104 of the network server 103 accesses the incoming melody storage unit by the received ID and extracts the corresponding incoming melody data to send the melody data to the network 102.

On receipt of the incoming melody data from the network server 103, the network 102 appends this incoming melody data to the call signal or the mail from the mobile phone 101, to send the resulting incoming melody data to the mobile phone 106. The mobile phone 106 converts the incoming melody data, received from the network 102, into data that may be replayed by the loudspeaker of the mobile phone 106 to actuate the loudspeaker.

If the transmitting party requests the list of the incoming melodies within the network server 103, in order to make a call or transmit a mail with the mobile phone fitted with the incoming melody designating function of the present embodiment, the list of the incoming melodies, sent from the network server, is received over the network 102. The control circuit 705 demonstrates the list of the received incoming melodies on the display unit 714 at the time of actuating the incoming melody selection display menu.

From the list of the incoming melodies, demonstrated on the display unit 714, the transmitting party selects the ID, which is in keeping with the order of priority of the call or mail to be transmitted or with the contents envisioned by the transmitting party, by acting on the key switch 710. When the transmitting party makes a call or transmits a mail as he/she enters the telephone number of the incoming side mobile phone or the mail address with the key switch 710, the incoming melody designating controller 706 transmits the ID corresponding to the designated incoming melody over the transceiver circuit 702 and the antenna 701 to the network.

In the present embodiment, the incoming melodies prepared by the incoming melody formulation control unit 707 or the sound data recorded by the voice memory control unit 708 by the transmitting party may be recorded in the incoming melody storage unit of the network server and may also be added to the list of the incoming mails, whereby it is possible to designate these data by IDs in making a call or transmitting a mail, as other incoming melodies.

In making a call or transmitting a mail, the data of the incoming melodies, transmitted by the network, is received by the antenna 701 and transduced by the control circuit 705 into sound data which will be radiated from the loudspeaker 712. If the mobile phone is set to the manner mode by the manner mode setting circuit 715, the manner mode check controller 709 in the control circuit 705 verifies whether or not the current mode is the manner mode. If the current mode is the manner mode, that effect is notified to the network. Thus, the network may recognize that the melody transmitted is not being replayed by the incoming side mobile phone.

Figure 8:
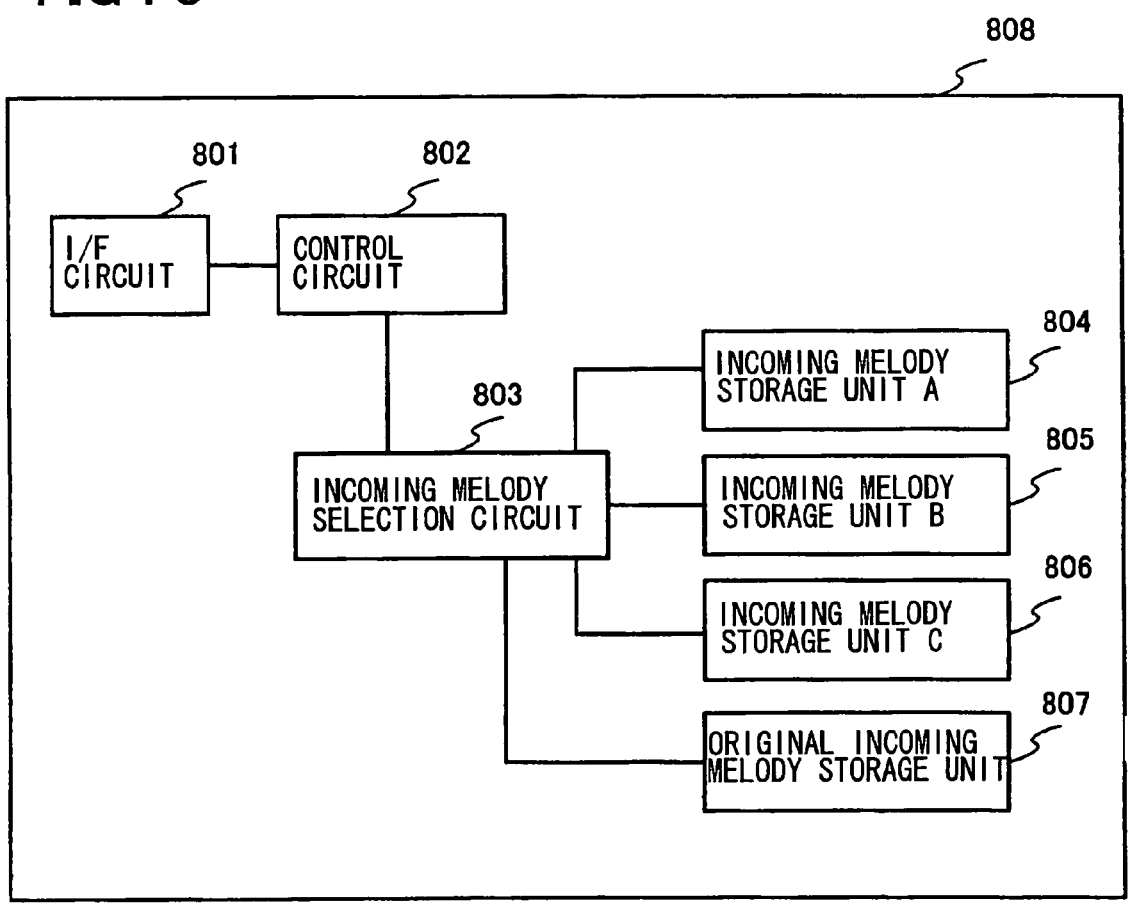
FIG. 8 is a block diagram of an example of a network server used in the second embodiment.

FIG. 8 depicts a block diagram of an example of a network server used in the second embodiment. An I/F circuit 801 transmits/receives incoming melodies or IDs thereof or transmits the list of the incoming melodies with the network. In the present embodiment, the network server includes, in addition to an incoming melody storage unit A804, an incoming melody storage unit B805 and an incoming melody storage unit C806, an original incoming melody storage unit 807 in which to register the incoming melodies prepared at the outset by the transmitting party or to register sound data recorded by the voice memo. The incoming melodies are stored on the genre basis. The incoming melodies may be suitably classified according to genres, such as into melodies expressing pleasant feeling, melodies expressing anger, melodies expressing the feeling of apology, or into jazz, classic or pops. The control circuit 802 controls an incoming melody selection circuit 803 or updates and supervises the list of the incoming melodies.

Figure 9:
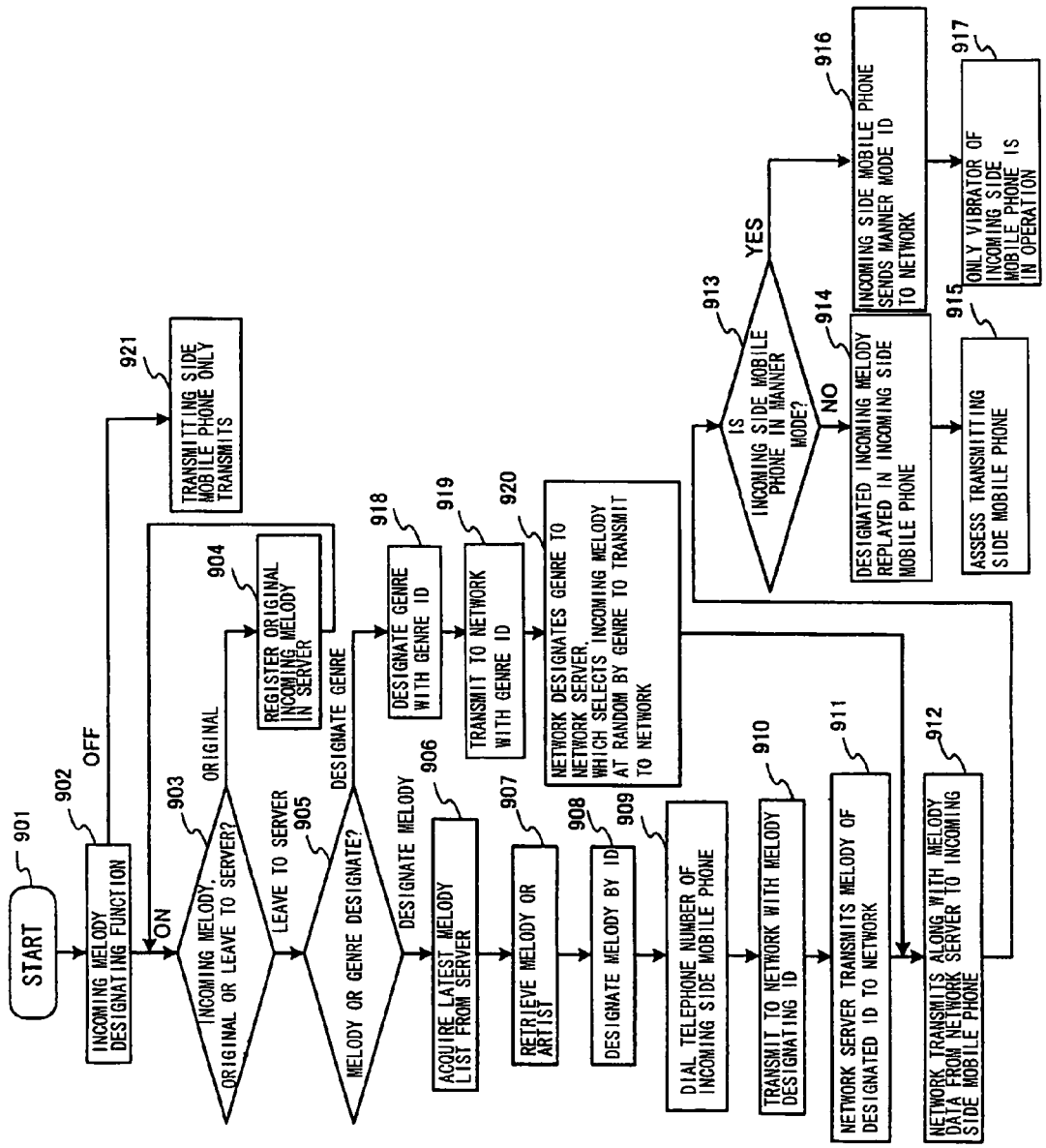
FIG. 9 is a flowchart showing the control operation of the second embodiment of the present invention.

FIG. 9 is a flowchart showing the control operation of the second embodiment of the present invention. In the present embodiment, one of two menu image surfaces, shown in FIGS. 4 and 5, may be selectively used. The operation of the present embodiment is now explained with reference to FIGS. 1, 4, 5 and 7 to 9. FIG. 9 illustrates the case of making a call.

The transmitting party effectively sets the incoming melody designating function (step 902) and then selects whether the incoming melody desired is to be one out of the incoming melodies already stored in the network server 103, or the incoming melody newly prepared by the transmitting party or sound data recorded by the voice memo is to be used (step 903).

If the transmitting party intends to use the newly prepared incoming melody or sound data recorded by the voice memo, the newly prepared incoming melody or sound data recorded by the voice memo is first registered in the network server 103 and stored in an original incoming melody storage unit 807 (step 904). After registration, the transmitting party commands selection from the incoming melodies stored in the network server 103.

The transmitting party then decides whether a melody of the incoming melodies is to be designated, or a genre is specified to leave the melody designation up to the network (step 905). If the transmitting party has selected melody designation, the transmitting party requests and acquires the list of the incoming melodies from the network server (step 906). The transmitting party then retrieves the names of the melodies or the names of the artists for the desired incoming melody (step 907) to decide on the melody of the incoming melody from the retrieved contents (step 908).

The transmitting party then dials the telephone number of the incoming side mobile phone to make a call (step 909). The transmitting side mobile phone sends the incoming melody, selected by the step 908, along with the ID specifying the selected incoming melody, to the network 102 (step 910). The network 102 requests the incoming melody data, corresponding to the ID, specified by the step 901, from the network server 103 (step 911).

The network 102 then transmits the incoming melody, acquired in the step 911, to the incoming side mobile phone (step 912). Except if the incoming side mobile phone is the manner mode (step 913), the incoming side mobile phone replays the incoming melody transmitted in the step 912 (step 914). The transmitting party of the transmitting side mobile phone is charged with the incoming melody use fee (step 915).

If the incoming side mobile phone is set to the manner mode (step 913), the incoming side mobile phone sends that effect to the network 102 (step 916). The incoming side mobile phone actuates only a vibrator, without replaying the incoming melody (step 917). Thus, the transmitting party of the transmitting side mobile phone is not charged with the use fee of the incoming melody.

If, in the step 905, genre designation is selected, the transmitting party designates a desired genre from the genre designation menu of the incoming melodies demonstrated on the display unit 714 of the transmitting side mobile phone, as shown in FIG. 5 (step 918). The transmitting party dials the telephone number of the incoming side mobile phone, along with the ID indicating the selected genre, for transmitting the telephone number and the ID to the network 102 (step 919).

The network 102 transmits the ID, received in the step 919, to the network server 103. The network server 103 selects an incoming melody at random from the genre corresponding to the designated ID. The incoming melody data selected is transmitted by the network server 103 to the network 102 (step 920). The network 102 transmits the call or mail, along with the incoming melody data, transmitted in a step S920, to the incoming side mobile phone (step 912). The ensuing operations are those of the aforementioned steps S912 to S917, as in the case of the incoming melody designation, as described above.

Meanwhile, if the incoming melody designation function of the transmitting mobile phone in the step S902 is OFF, only the telephone number of the incoming side mobile phone is transmitted. Moreover, if the incoming melody designation function of the incoming mobile phone is OFF, the incoming melody, stored and set in the incoming side mobile phone, is replayed when the incoming call is that from the transmitting side mobile phone, with the designated incoming melody (step S921).

Figure 10:
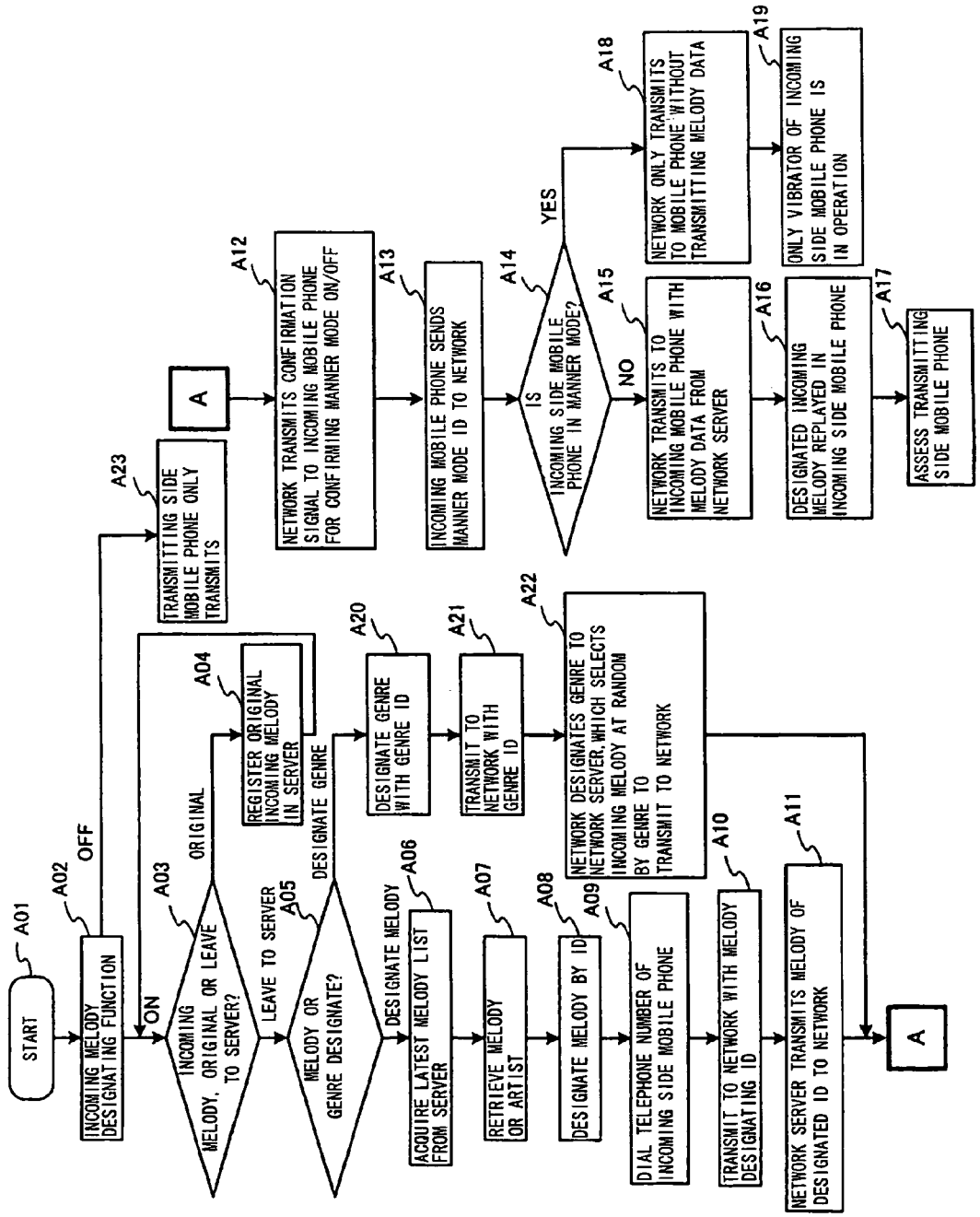
FIG. 10 is a flowchart showing the control operation of a third embodiment of the present invention.

FIG. 10 depicts a flowchart showing the control operation of a third embodiment of the present invention. In the first and second embodiments, the network 102 sends the incoming melody data, received from the network server 103, to the incoming side mobile phone, without dependency on whether or not the incoming side mobile phone is in the manner mode. In the present embodiment, the incoming melody data is not transmitted to the incoming side mobile phone when the incoming side mobile phone is in the manner mode, thereby evading an unneeded load possibly applied to the network. The present embodiment is otherwise the same as the second embodiment. Meanwhile, FIG. 10 shows the case of making a call.

The transmitting party effectively sets the incoming melody designating function (step A02). The transmitting party then selects the desired incoming melody from the incoming melodies already stored in the network server, or exploits the incoming melody newly prepared by the transmitting party or voice data recorded in the voice memo (step A03). If the transmitting party is desirous to exploit the incoming melody newly prepared by the transmitting party or voice data recorded in the voice memo, the incoming melody newly prepared by the transmitting party or voice data recorded in the voice memo is recorded in the network server 103 (step A04).

The transmitting party then selects whether the melody is designated for the incoming melody or only the genre is designated to leave melody designation up to the network server (step A05). In case the transmitting party has selected the melody designation, the transmitting party requests and acquires the list of the incoming melodies from the network server by the mobile phone (step A06). The transmitting party then retrieves the desired incoming melody from the names of the melodies or the artists (step A07). The melody of the incoming melody is determined from the retrieved contents of the step A07 (step A08).

The transmitting party dials the telephone number of the incoming side mobile phone to make a call (step A09). The transmitting side mobile phone sends the incoming melody, determined in the step A08, along with the designating ID, to the network 102 (step A10). The network 102 requests an incoming melody, corresponding to the ID, designated in the step A10, to the network server 103 (step A11).

The network 102 transmits a confirmation signal to the incoming side mobile phone, in order to confirm whether or not the incoming side mobile phone has been set to the manner mode (step A12). On receipt of the confirmation signal, the incoming side mobile phone sends a manner mode ID, indicating whether or not the manner mode has been set (step A13). In case the incoming side mobile phone is not in the manner mode (step A14), the network 102 sends the incoming melody data from the server 103 to the incoming side mobile phone (step A15).

The incoming side mobile phone replays the incoming melody transmitted from the network 102 (step A16). The transmitting party of the transmitting side mobile phone is charged with the incoming melody use fee (step A17). In case the incoming side mobile phone is in the manner mode (step A14), the network 102 only sends to the incoming side mobile phone without transmitting the incoming melody (step A18). The incoming side mobile phone actuates only a vibrator, without replaying the incoming melody (step A19). Thus, the transmitting party of the mobile phone is not charged with the use fee of the incoming melody.

In the present embodiment, if the incoming mobile phone is set to the manner mode, the network 102 does not transmit incoming melody data, designated by the transmitting side mobile phone, thereby evading an unneeded load possibly applied to the network.

Figure 11:
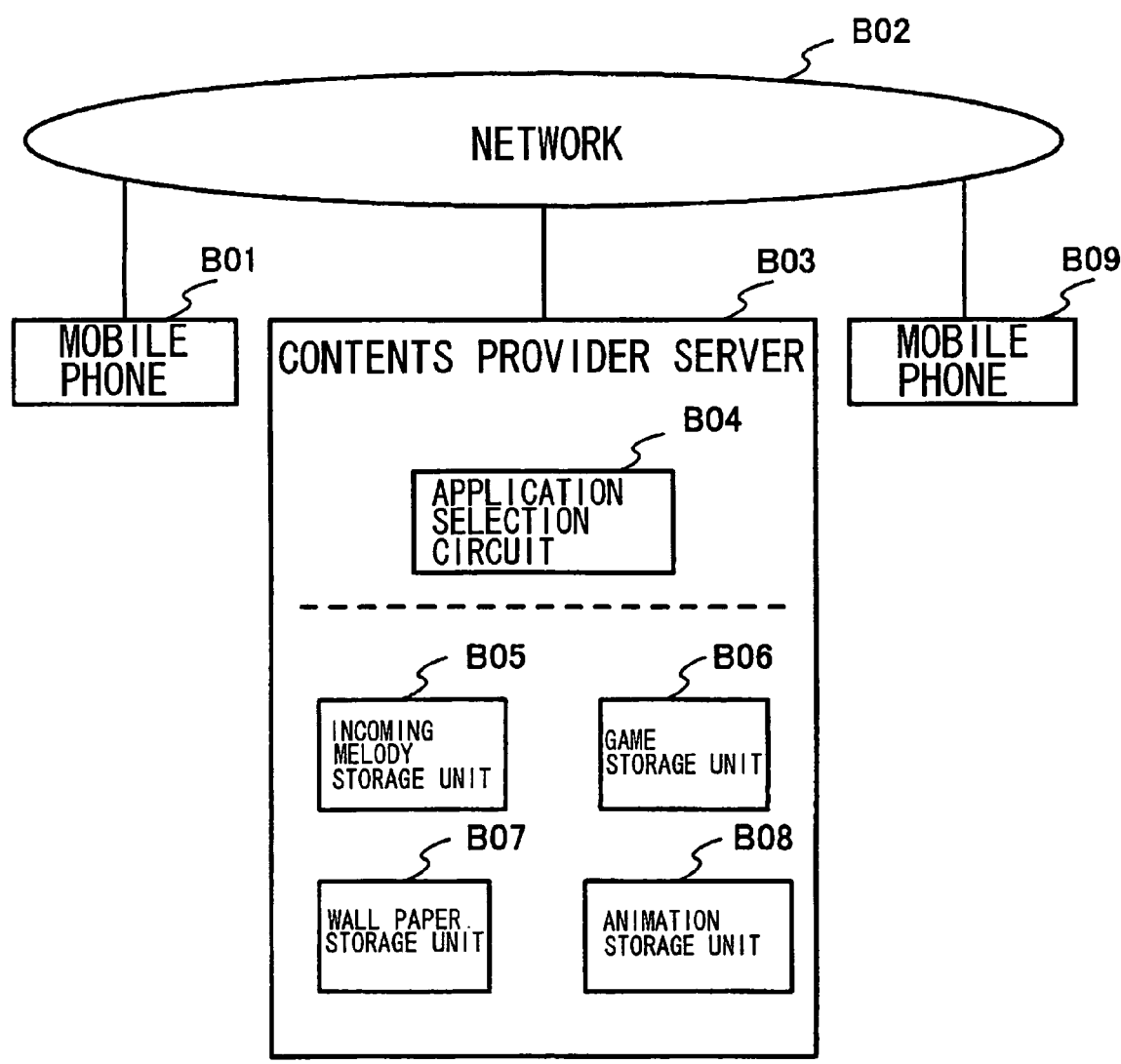
FIG. 11 is a block diagram showing a fourth embodiment in the mobile phone system fitted with an incoming melody designating function according to the present invention.

FIG. 11 is a block diagram showing a fourth embodiment in the mobile phone system fitted with an incoming melody designating function according to the present invention. In the present embodiment, a storage unit for storing application data, such as game, wall paper or animation, is provided in addition to the incoming melody storage unit, so that the transmitting party may transmit one or more of the game, wall paper and animation, in addition to the incoming melody, to the receiving party. The operation of the present embodiment is hereinafter explained.

First, the transmitting side mobile phone B01 requests and acquires the list of applications via network B02 from a contents provider server B03. The transmitting side mobile phone B01 then selects the application, desired to be transmitted to an incoming side mobile phone B09, from among the incoming melodies stored in an incoming melody storage unit B05, a game stored in a game storage unit B06, the wall paper stored in a wall paper storage unit B07 and the animation stored in an animation storage unit B08.

The transmitting party of the transmitting side mobile phone B01 advises the network B02 of the telephone number of the incoming side mobile phone B09 by a multi-media service mail, short mail or telephone call. When the network B02 sends the ID, designated by the transmitting side mobile phone B01, to the contents provider B03, the contents provider server B03 selects and reads out the application, relevant to the ID designated by the transmitting side mobile phone B01, by an application selection circuit B04, to transmit the relevant application over network B02 to the incoming side mobile phone B09. The transmitting party of the transmitting side mobile phone B01 is charged with the contents fee by the contents provider server B03. The incoming side mobile phone B09 stores the received application data and, on receipt or at the time of the starting process after receipt, executes the operation pertinent to the application data.

Meanwhile, the mobile phone B09 may perform, on call incoming, the operation pertinent to the application data, other than the incoming melody data received, such as wall paper, in order to enable the receiving party to enjoy the incoming state other than the incoming melody on call incoming. When the mobile phone B09 is set to the manner mode, the application data received may be transiently stored, so that, on releasing the manner mode or on opening the incoming information, the stored application data may be extracted to confirm the application data.

Figure 12:
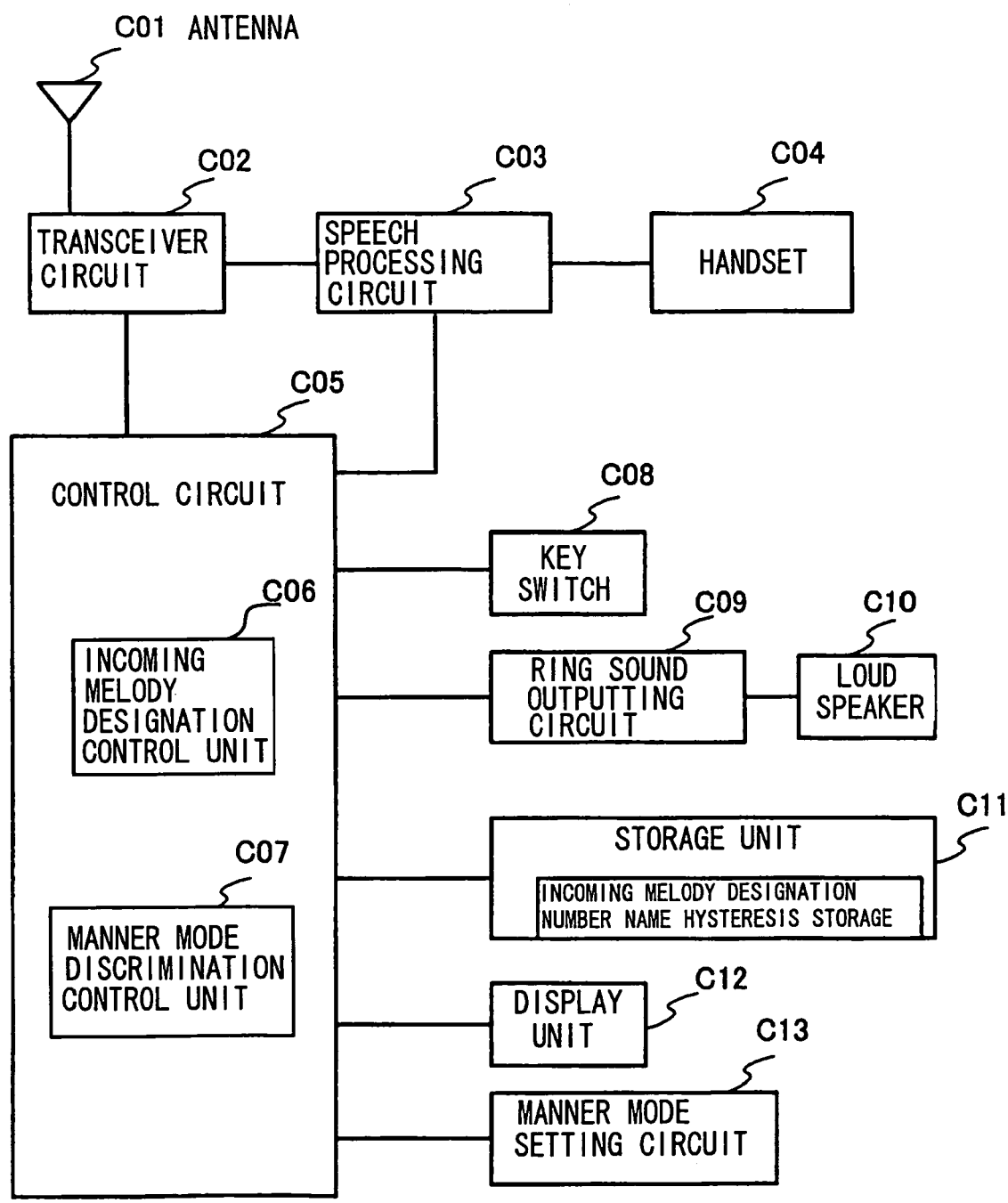
FIG. 12 is a block diagram showing a mobile phone fitted with an incoming melody designating function according to a fourth embodiment of the present invention.
Figure 13:
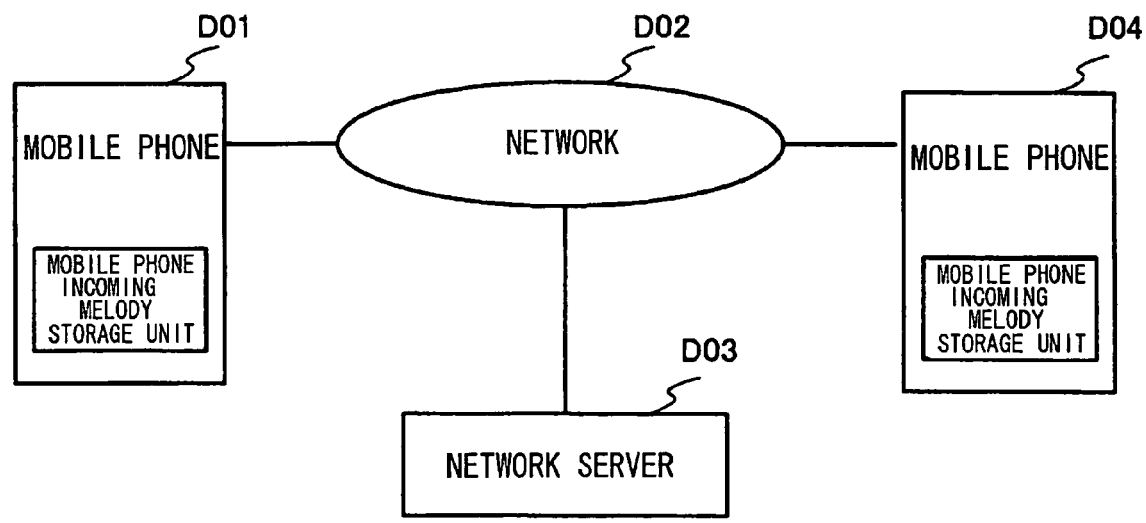
FIG. 13 shows a conventional mobile phone system.
Figure 14:
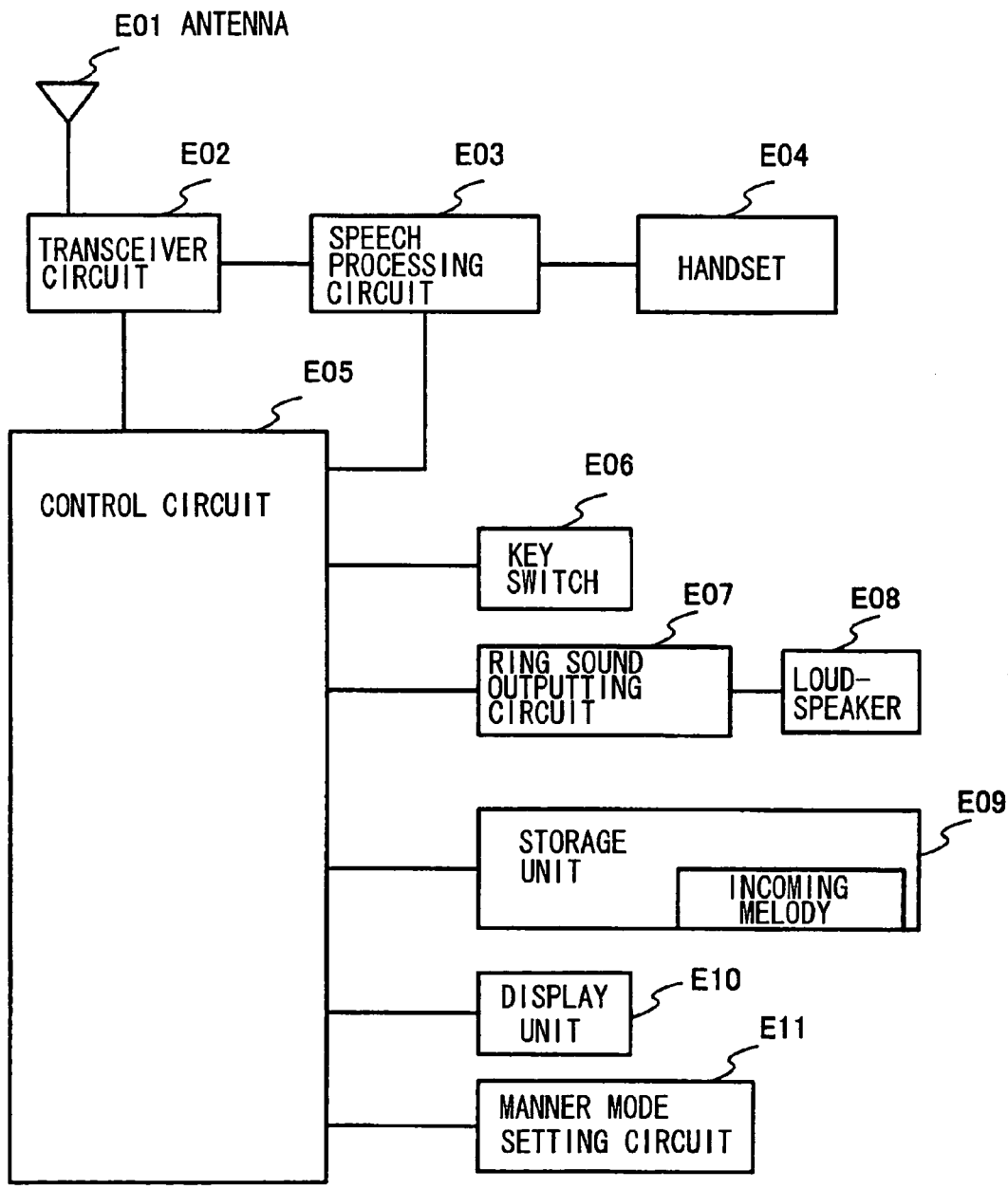
FIG. 14 is a block diagram showing a conventional mobile phone.

FIG. 12 is a block diagram showing a mobile phone fitted with an incoming melody designating function according to a fourth embodiment of the present invention.

The mobile phone fitted with the incoming melody designating function of the present embodiment includes an antenna C01, a transceiver circuit C02 for controlling the wireless communication, a speech processing circuit C03 for converting speech signals into digital signals or for converting the digital signals into speech, a handset C04, a control circuit C05 for performing various controls for the mobile phone, such as transmission/receipt control, speech processing control or display control, an incoming melody designating control unit C06 for selecting and designating an ID of a relevant incoming melody from the incoming melody list of incoming melodies stored in the network server, a manner mode check control unit C07 for verifying whether or not the current mode is the manner mode and, if the current mode is the manner mode, advising the network of that effect, a key switch C08, made up of plural keys for performing various controls, such as incoming melody transmission or setting, and other control operations, a ring sound outputting circuit C09, and a loudspeaker C10. The mobile phone also includes a storage unit C11 for storing the history of incoming calls, telephone numbers or mail addresses, and setting values to various data, a display unit C12 and a manner mode setting circuit C13.

In the present embodiment, the history of incoming melodies, designated in the past, are stored in the storage unit C11, so that the transmitting party may refer to the hysteresis to designate the incoming melody to the receiving party. Thus, if the incoming melodies, designated in the past, are used again, it is only necessary to designate the ID of the incoming melody, by referring to the history of the names of the melodies of the incoming melodies, and hence the operation of acquiring and designating the information from the network server (steps 603 and 604 of FIG. 6) may be omitted, while the load imposed on the network may also be relieved.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A mobile phone system having an incoming melody designating function, said system comprising mobile phones, a network to which said mobile phones are connectable, and a network server for storing a plurality of incoming melody data in association with identifiers (IDs) thereof;
   any one of said mobile phones including means for retrieving a list of incoming melodies stored in said network server, means for designating, by said ID, a desired incoming melody, as selected by said retrieving function; means for appending an ID of the selected incoming melody to transmission information that includes a contact site of a counterpart party, to send out the resultant ID-transmission information to said network, and means for extracting an incoming melody data to replay said incoming melody data by incoming announcing means, on receipt of the incoming information including said incoming melody data from said network;
   said network including means for extracting the ID of said incoming melody from the transmission information, received from said mobile phone, and having the ID of said incoming melody appended thereto, and for transmitting the extracted ID to said network server, and means for appending incoming melody data corresponding to said ID, received from said network server, to the incoming information, corresponding to said transmission information, and for transmitting the melody data-incoming information to another mobile phone specified by said transmission information;
   said network server including means for reading out an incoming melody data corresponding to said ID thereof on receipt of said ID from said network and for transmitting the so read-out incoming melody data to said network, wherein,
   said one phone corresponds to a transmitting party,
   said another mobile phone corresponds to a receiving party,
   said means for retrieving the list of incoming melodies stored in said network server, allows the transmitting party to select, out of the list incoming melodies stored in the network server, the incoming melody which the transmitting party desires to be replayed by the another mobile phone of the receiving party, thereby enabling the transmitting party to designate the incoming melody of the another mobile phone of the receiving party.

2. A mobile phone system having an incoming melody designating function, said system comprising mobile phones, a network to which is connected said mobile phone, and a network server for storing a plurality of incoming melody data in association with identifiers (IDs) thereof;
   any one of said mobile phones including means for retrieving a list of incoming melodies stored in said network server, means for designating, by one of said IDs, a desired incoming melody, as selected by said retrieving function, means for appending an ID of the selected incoming melody to transmission information that includes a call signal or a mail address, to send out the resultant ID-transmission information to said network, and means for extracting an incoming melody data to replay an incoming melody data by incoming announcing means, on receipt of the incoming information including said incoming melody data from said network;
   said network including means for extracting the ID of said incoming melody from the transmission information, received from said mobile phone, and having the ID of said incoming melody appended thereto, and for transmitting the extracted ID to said network server, and means for appending an incoming melody data corresponding to said ID, received from said network server, to the incoming information, corresponding to said transmission information, and for transmitting the melody data-incoming information to another mobile phone specified by said transmission information;
   said network server including means for reading out an incoming melody data corresponding to said ID thereof on receipt of said ID from said network and for transmitting the so read-out incoming melody data to said network, wherein,
   said one phone corresponds to a transmitting party, said another mobile phone corresponds to a receiving party, said means for retrieving the list of incoming melodies stored in said network server, allows the transmitting party to select, out of the list incoming melodies stored in the network server, the incoming melody which the transmitting party desires to be replayed by the another mobile phone of the receiving party, thereby enabling the transmitting party to designate the incoming melody of the another mobile phone of the receiving party.

3. The mobile phone system having the incoming melody designating function, as defined in claim 1, wherein the mobile phone includes means for setting a manner mode, means for halting the replay of said incoming melody data when said manner mode has been set and when said incoming information added by said incoming melody data has been received from said network, means for storing at least the incoming melody data when said incoming information added by said incoming melody data has been received, and means for extracting said stored incoming, melody data by release of said manner mode or by opening the incoming information for replaying said incoming melody by incoming announcing means.

4. The mobile phone system having the incoming melody designating function, as defined in claim 1 wherein the mobile phone includes means for setting a manner mode, means for transmitting to said network the information to the effect that the manner mode has been set, when said manner mode has been set and when the incoming information added by said incoming melody data has been received, and means for halting the replay of said incoming melody data.

5. The mobile phone system having the incoming melody designating function, as defined in claim 1 wherein the mobile phone includes means for setting a manner mode, and means for transmitting the manner mode setting information to said network on receipt of a manner mode setting conformation signal from said network;

said network including means for transmitting said manner mode setting conformation signal to another mobile phone specified by said transmission information, and means for halting the transmission of said incoming melody data to said other mobile phone on receipt of the information indicating the setting of said manner mode from said other mobile phone.

6. The mobile phone system having the incoming melody designating function, as defined in claim 1 wherein the mobile phone includes means for transmitting unique melody data formulated by a transmitting party or sound data, obtained on recording a speech, to said network server, as incoming melody data to said network server for registration therein; and wherein said network server includes original incoming melody storage unit for registering unique melody data, formulated by a transmitting party, or sound data obtained on recording the speech, as said ID is appended to said unique melody data or sound data.

7. The mobile phone system having the incoming melody designating function, as defined in claim 1, wherein said network server includes means for transmitting to said network the incoming melody data read out at random from a specified genre, when an ID received over said network from said mobile phone specifies the genre of the incoming melody.

8. The mobile phone system having the incoming melody designating function, as defined in claim 1, wherein said mobile phone includes an incoming melody designation melody name history storage unit for storing the history of said incoming melodies designated in the past and means for selecting and designating said incoming melody ID from said incoming melody designation melody name history storage unit.

9. The mobile phone system having the incoming melody designating function, as defined in claim 1 wherein said network server is a contents provider server for storage not only of said incoming melody data but of a variety of application data in association with an identifier (ID), and includes means for selecting and reading out said application data corresponding to the ID designated from said mobile phone over said network, and means for transmitting the read-out application data over said network to an incoming side contact site from said mobile phone; and wherein said mobile phone includes means for acquiring a list of said applications from said contents provider server over said network, means for selecting one or more desired application data, to be sent to the incoming side mobile phone, from said list, and means for transmitting the information pertinent to the incoming side contact site to said contents provider server.

10. The mobile phone system having the incoming melody designating function, as defined in claim 8 wherein said application data includes a game, wall paper and animation data.

11. The mobile phone system having the incoming melody designating function, as defined in claim 8, wherein said mobile phone includes means for storing at least said application data on receipt of said incoming information added by said application data and means for executing the operation by said application data other than the stored incoming application data when the manner mode has been set and when the incoming information having said application data is received from said network.

12. A mobile phone used in the mobile phone system having the incoming melody designating function, as defined in claim 1, wherein said mobile phone includes means for retrieving a list of incoming melodies stored in said network server, means for designating a desired incoming melody, as selected by said retrieving function, by said ID, means for appending an ID of the selected incoming melody to the transmission information including the contact site of a counterpart party to transmit the ID transmission information to said network, and means for extracting said incoming melody data on receipt of the incoming information including the incoming melody data from said network for replaying said incoming melody by incoming announcing means.

13. A mobile phone used in the mobile phone system having the incoming melody designating function, as defined in claim 3, wherein said mobile phone includes means for retrieving a list of the incoming melodies stored in said network server, means for designating a desired incoming melody, as selected by said retrieving function, by said ID, means for appending the ID of the selected incoming melody to the transmission information including the contact site of a counterpart party and for transmitting the resultant ID-transmission information to said network, means for extracting said incoming melody data, on receipt from said network of the incoming information including the incoming melody data, for replaying the incoming melody by incoming announcing means, means for setting the manner mode, means for halting the replay of said melody data on receipt from said network of said incoming information having the incoming melody data under manner mode setting, means for storing at least said incoming melody data on receipt of said incoming information added by said incoming melody data, under manner mode setting, and means for extracting the stored incoming melody data, by manner mode releasing operation of incoming information opening operation, to replay the incoming melody by incoming announcing means.

14. A mobile phone used in the mobile phone system having the incoming melody designating function, as defined in claim 4, wherein said mobile phone includes means for retrieving a list of the incoming melodies stored in said network server, means for designating a desired incoming melody, as selected by said retrieving function, by said ID, means for appending the ID of the selected incoming melody to the transmission information including the contact site of a counterpart party and for transmitting the resultant ID-transmission information to said network, means for extracting said incoming melody data, on receipt from said network of the incoming information including the incoming melody data, for replaying the incoming melody by incoming announcing means, means for setting the manner mode, means for transmitting the fact that the manner mode has been set to said network on receipt from said network of said incoming information having said incoming melody data under manner mode setting, and means for halting the replay of said melody data on receipt from said network of said incoming information having the incoming melody data under manner mode setting.

15. A mobile phone used in the mobile phone system having the incoming melody designating function, as defined in claim 5, wherein said mobile phone includes means for retrieving a list of the incoming melodies stored in said network server, means for designating a desired incoming melody as selected by said retrieving function by said ID, means for appending the ID of the selected incoming melody to the transmission information including the contact site of a counterpart party and for transmitting the resultant ID-transmission information to said network, means for extracting said incoming melody data, on receipt from said network of the incoming information including the incoming melody data, for replaying the incoming melody by incoming announcing means, means for setting the manner mode, and means for transmitting the manner mode setting information to said network on receipt of said manner mode setting confirmation signal from said network.

16. A mobile phone used in the mobile phone system having the incoming melody designating function, as defined in claim 6, wherein said mobile phone includes means for retrieving a list of the incoming melodies stored in said network server, means for designating a desired incoming melody as selected by said retrieving function by said ID, means for appending an ID of the selected incoming melody to the transmission information including the contact site of a counterpart party, and for transmitting the resultant ID-transmission information to said network, means for extracting said incoming melody data on receipt from said network of the incoming information including the incoming melody data, for replaying the incoming melody by incoming announcing means, and means for transmitting unique melody data formulated by a transmitting party or speech data obtained on recording the voice as incoming melody data to said network server for registration therein.

17. A mobile phone used in the mobile phone system having the incoming melody designating function, as defined in claim 8, wherein said mobile phone includes means for retrieving a list of the incoming melodies stored in said network server, means for designating a desired incoming melody, as selected by said retrieving function, by said ID, means for appending the ID of the selected incoming melody to the transmission information, including the contact site of a counterpart party, and for transmitting the resultant ID-transmission information to said network, means for extracting said incoming melody data on receipt from said network of the incoming information including the incoming melody data, for replaying the incoming melody by incoming announcing means, incoming melody designation melody name history storage means for storing the history of said incoming melodies designated in the past, and means for referencing said incoming melody designation melody name history storage means for selecting said incoming melody ID.

18. A mobile phone used in the mobile phone system having the incoming melody designating function, as defined in claim 9, wherein said mobile phone includes means for retrieving a list of the incoming melodies stored in said network server, means for designating a desired incoming melody, as selected by said retrieving function, by said ID, means for appending the ID of the selected incoming melody to the transmission information, including the contact site of a counterpart party, and for transmitting the resultant ID transmission information to said network, means for extracting said incoming melody data on receipt from said network of the incoming information including the incoming melody data for replaying the incoming melody by incoming announcing means, means for acquiring a list of said applications from said contents provider server over said network, means for selecting one or two or more desired application data from said list for transmission to an incoming side mobile phone, and means for transmitting the information to an incoming side contact site to said contents provider server.

19. A mobile phone system having an incoming melody designating function, said system comprising:

a transmitting party mobile phone and a receiving party mobile phone, each mobile phone have an incoming melody designating function;

a network to which said mobile phones are connectable; and a network server for storing a plurality of incoming melody data in association with corresponding identifiers (IDs) thereof, wherein, A) said mobile phones each include means to retrieve a list of incoming melodies stored in said network server, means to designate, by one of said identifiers, a desired incoming melody, as selected by said retrieving function of the transmitting party mobile phone, means to append an ID of the selected incoming melody to transmission information that includes one of i) a call signal, ii) a mail address, and iii) a contact site of a counterpart receiving party mobile phone, to send out the resultant ID transmission information to the receiving party mobile phone via said network, and means to extract an incoming melody data to replay an incoming melody data by incoming announcing means, on receipt of the incoming information including said incoming melody data from said network, B) said network includes means to extract the ID of said incoming melody from the transmission information, received from said transmitting party mobile phone, and having the ID of said incoming melody appended thereto, and to transmit the extracted ID to said network server, and means to append an incoming melody data corresponding to said ID, received from said network server, to the incoming information, corresponding to said transmission information, and to transmitting the melody data-incoming information to the receiving party mobile phone specified by said transmission information, and C) said network server includes means to read out an incoming melody data corresponding to said ID thereof on receipt of said ID from said network and to transmit the so read-out incoming melody data to said network for transmission to said receiving party mobile phone, wherein, said means to retrieve, said means to designate, and said means to append allows a transmitting party operating the transmitting party mobile phone to select, out of the list incoming melodies stored in the network server, the incoming melody which the transmitting party desires to be replayed by the receiving party mobile phone, thereby enabling the transmitting party to designate the incoming melody of the receiving party mobile phone.

* * * * *